April 6, 1937.  C. DE GANAHL  2,075,977
FUEL TANK FOR AIRCRAFT
Filed Sept. 14, 1934  2 Sheets-Sheet 1

INVENTOR.
Carl De Ganahl.
BY
his ATTORNEY.

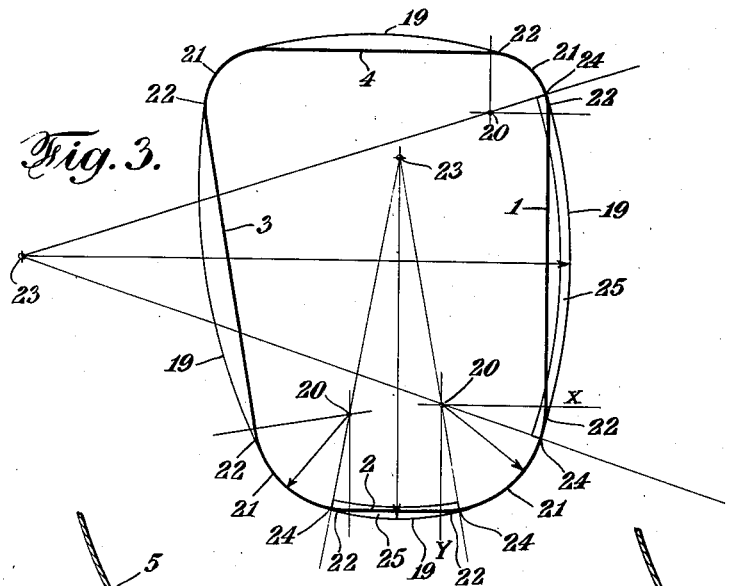
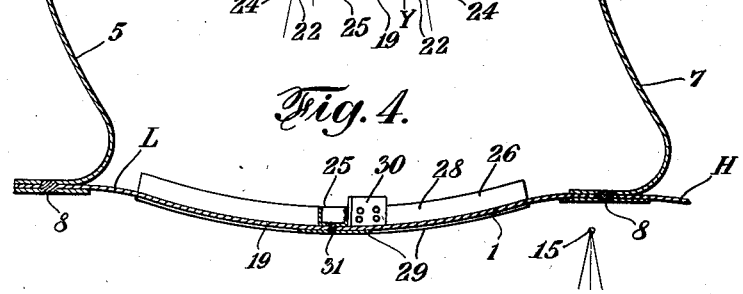
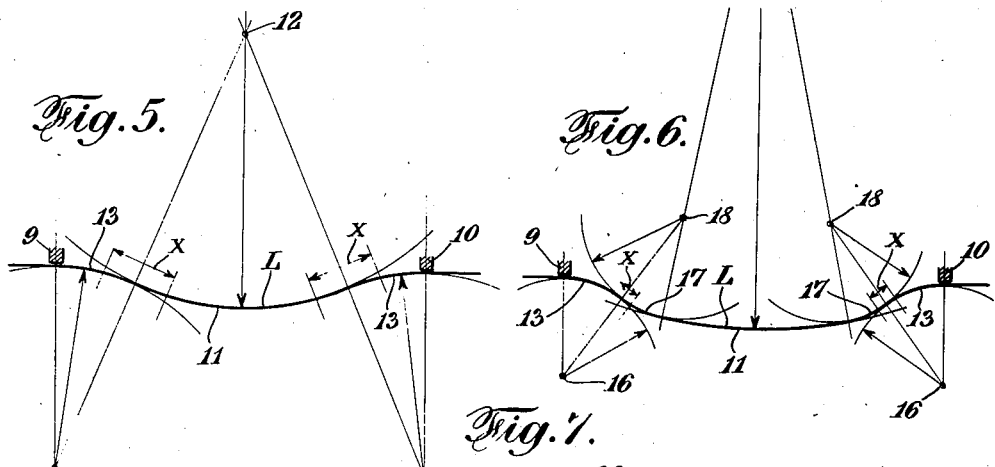

Patented Apr. 6, 1937

2,075,977

UNITED STATES PATENT OFFICE 2,075,977

FUEL TANK FOR AIRCRAFT

Carl de Ganahl, Greenlawn, N. Y., assignor to Fleetwings, Inc., Garden City, Long Island, N. Y., a corporation of Delaware Application September 14, 1934, Serial No. 743,968

11 Claims. (Cl. 220—71)

This invention relates generally to a fuel tank for aircraft, and particularly to the manner of forming and strengthening the walls of such a tank against the damaging effects of vibration, the invention being of course applicable to tanks for various other purposes where problems of weight, and vibratory movement are to be contended with.

Owing to the great engine power carried by aircraft, particularly airplanes, and the consequent vibration of the craft in flight, the fuel tanks are subject to severe vibration. Failure of the fuel tank means not only loss of valuable fuel but also the attendant dangers including the fire hazard. The utmost care must therefore be taken to overcome the tendency of the tank to fracture due to the vibration.

Fuel and like tanks for use aboard aircraft are of various shapes and sizes, in order that they may be accommodated within the irregular spaces available to receive them in the confined quarters aboard aircraft, as for instance between the walls or within the wing structure of such craft. In order to make the most complete and economical use of the available space it is impractical to make up these tanks as simple cylinders, and on this account it has been necessary to resort to numerous expedients to avoid fracture due to vibration of the substantially flat wall portions of the irregularly, or non-cylindrical, shaped tanks.

Of course these tanks must of necessity always be of the least possible weight, which means that the sheet metal employed in their construction must be as thin as possible. And this in turn means that the flat walls which are made up of this thin sheet metal will be likely to develop fracture whenever any excessive vibration thereof is possible, and particularly along the marginal portions of the walls adjacent to where they are fixed to the firmer and more substantial elements of the tank structure.

Extensive experiments and tests have determined that in order to minimize the tendency to fracture in any localized area of the tank wall under stresses incident to vibration of the tank and of its component parts with respect to each other the tank as a whole should be stiff and yet not rigid. While total rigidity might be desirable as a means to avoid fracture, yet obviously it would entail such great thickness and weight of metal as is positively prohibitive in aircraft design.

Each of the flat wall portions of tanks which are made up of the thinner metal required in airplane designs are subject to a certain degree of vibratory movement or "panting." Interior diaphragms usually divide these walls into independently vibratable sections and such adjacent sections may or may not vibrate in synchronism at any one time because the strains imposed upon said sections vary constantly due to numerous influences such as temperature changes causing expansion and contraction differing in the different connected metallic parts, atmospheric pressure constantly changing as the craft travels at different altitudes, wind changes in intensity and direction against the whirling propeller causing different degrees and directions of vibratory movement of the tank, varying condition of the engine of the craft causing different degrees of vibration, and particularly the ever changing liquid level and weight within the tank.

The problem of designing a tank of sufficiently light weight and of just the right degree of flexibility to meet these conditions and requirements is an important one, and the problem of designing the comparatively extensive side wall portions of these tanks, as distinct from the end walls, is a particularly serious problem which it is the object of the present invention to solve.

A further object is to so design the side walls as to embody principles of construction which may be readily followed in the building of tanks varying widely in both size and shape.

A further object is to so design the side walls that they may be readily produced of thin sheet metal and assembled in the tank structure at small cost.

A more detailed object is to so design the side walls that portions of themselves will be relatively stiff and non-vibratory and to provide efficient means whereby portions likely to be more vibratory are re-inforced and supported from the firmer portions in such way as to effectually distribute the stresses and avoid a damaging degree of vibratory movement at any localized point.

A further detailed object is to provide means to meet the problems arising from differences in vibration of adjacent sections of the side wall.

A general purpose is to attain a maximum degree of stiffness without concentration of stresses.

Other objects and aims of the invention, more or less specific than those referred to above, will be in part obvious and in part pointed out in the course of the following description of the elements, combinations, arrangements of parts and applications of principles constituting the invention; and the scope of protection contemplated will be indicated in the appended claims.

In the accompanying drawings which are to be taken as a part of this specification, and in which I have shown merely a preferred form of embodiment of the invention:—

Fig. 3 is a view similar to Fig. 2 but being in diagram so as to better illustrate certain of the principles of construction.

Fig. 4 is an enlarged horizontal sectional view substantially on the plane of line IV—IV of Fig. 1.

Fig. 5 is a view similar to Fig. 4 but being in diagram for the better illustration of another principle of construction.

Fig. 6 is similar to Fig. 5 but illustrating a slightly modified contour of the wall part concerned, and Fig. 7 is an enlarged fragmentary detail view on line VII—VII of Fig. 1.

Figure 1:
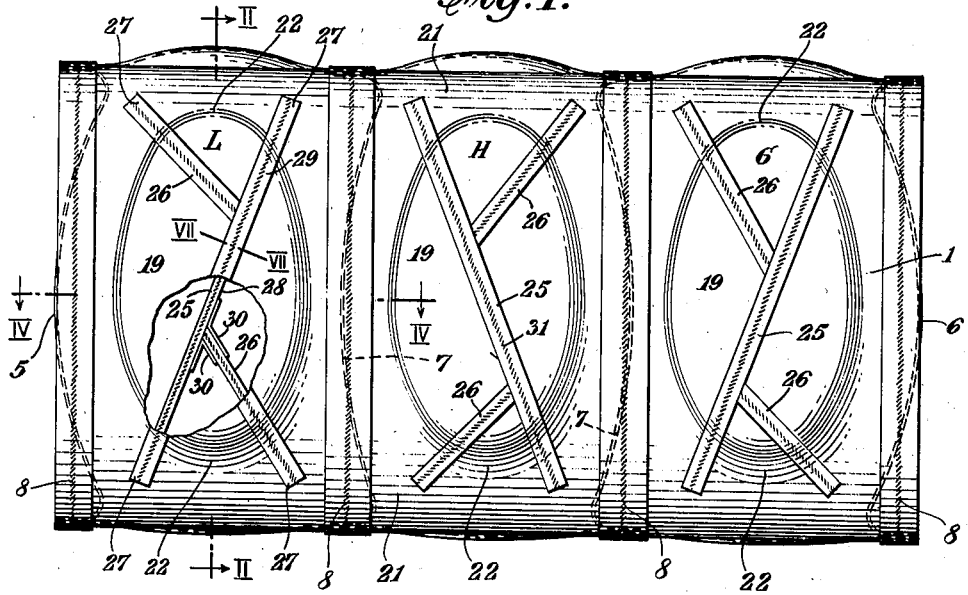
Fig. 1 is a side elevational view of a tank constructed in accordance with this invention, parts being broken away for better disclosure of details.
Figure 2:
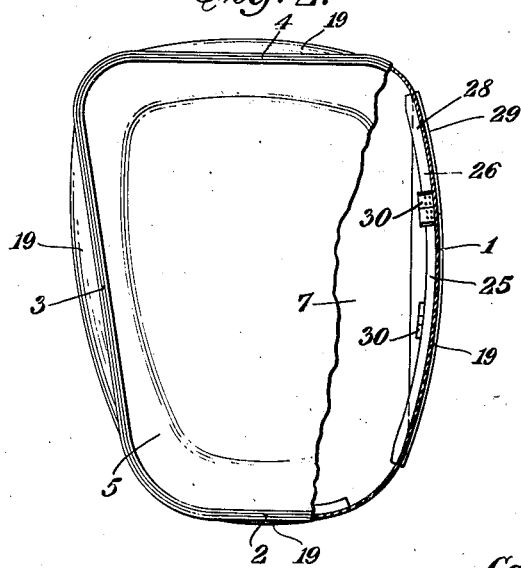
Fig. 2 is an end view with part broken away and shown in vertical section on line II—II of Fig. 1.

Referring to the drawings for describing in detail the exemplary structure which is illustrated therein, it will be seen that the tank shown is made up of walls 1, 2, 3 and 4, each of which for the purpose of this description will be termed—side-walls, opposite end walls 5 and 6, and a plurality of cross diaphragms as 7—7 interiorly of the tank.

All of these parts are preferably formed of thin sheet metal, and the end walls and the diaphragms are of course depended upon to hold the side walls in the non-circular shape required to properly fit within a given space in the aircraft structure. These parts are suitably connected together, as by seam welding indicated 8 in the drawings.

The fixture of the side walls to the diaphragms divides the wall area into a plurality of independent sections as L, G and H, dependent upon the number of diaphragms present. The portion of the wall which is fixed to the diaphragm marks a line of division between adjacent sections, and these adjacent sections will always by subject to vibration or panting independently of each other, and the vibratory motions of adjacent sections may or may not be in synchronism.

A tendency is of course always present for fracture to develop in the wall sections along opposite sides of the diaphragms due to the fatiguing effect of the back and forth hinge action in these regions resulting from the vibratory movements of central portions of the sections with respect to the firmer marginal portions fixed to the diaphragms or end walls.

To this end the present invention proposes that each separate section, L, H and G, of the side wall, wherever it presents a relatively flat expanse likely to vibrate objectionably, shall be domed approximately semi-spherically as indicated so as to partially overcome the flexibility of said areas and to afford stiffness and prevent as far as possible all localization of vibratory movement.

The relatively horizontal cross-sectional contour of the wall between spaced supports as produced by the doming is important, and the principles to be followed in this connection are clearly illustrated in Fig. 5.

In this figure the wall section L is indicated by the heavy curved line, and the spaced supports are indicated 9 and 10. The supports 9 and 10 may be either a pair of the diaphragms, or a diaphragm and an end wall or they may in some cases be only re-inforcing or supporting bars or ribs or the like having the function of holding relatively rigid the opposite marginal portions of the wall.

The main central portion 11 of the wall or line L between the supports is struck upon a radius from center 12 while the opposite marginal portions 13—13 adjacent to the supports are struck upon radii from centers 14—14.

The portions 11 and 13 curve oppositely but are tangential so that all portions of the wall between the two supports are curved. No flat areas likely to vibrate occur at any point, and the dome is sufficiently high proportional to the distance between the supports so that the curvature of each portion throughout is sufficient to apply edgewise resistance of the metal against the tendency of the metal to vibrate. Even in the juncture regions indicated X, where the portions 11 and 13 merge together and reverse curvature, there is substantially the same degree of curvature as elsewhere so that no flat area exists to vibrate.

The modification Fig. 6 suggests how the juncture regions X may be reduced in extent if desired. Here the main central portion 11 is struck from center 15, being on a greater radius than in Fig. 5. The marginal portions 13—13 are struck from centers 16—16, being of smaller radii than in Fig. 5, and intermediate the portions 11 and 13 there are connecting portions 17—17 struck from centers 18—18 being of about the same radii as the portions 13—13.

The portions 11 and 17 are tangential and curve in the same general direction, the portions 17 being simply of a less radius than the portion 11.

The portions 17 and 13 are also tangential but curve oppositely being in the same general relation as the portions 11—13 in Fig. 5, but because of their shorter radii they at least lessen the width of and in most cases obviate the relatively flat juncture region X where the reversed curvatures merge.

The relatively vertical cross-sectional contour of the individual wall sections as produced by the doming differs from the horizontal but is equally as important in producing the total result sought, and the principles to be followed in this connection are clearly illustrated in Fig. 3.

In Fig. 3 the heavy black line indicates the cross-sectional shape of the tank at the diaphragms, and the domes as 19—19 which occur one in each of the relatively flat expanses or side wall portions 1—4 are indicated by lighter lines bearing that reference numeral.

At the corners between the flat expanses the sheet metal forming the side walls is bent around on curves of generous radii, as from the centers 20—20 indicated, forming semi-cylindrical corner portions 21—21.

The semi-cylindrical corners 21 extend continuously through the entire length of the tank and are substantially without interruption except where the upper and lower end portions of the domes of the sections L, H and G, protrude tangentially into them, as at 22—22. They traverse all of the sections L, H, G, and, because of their semi-cylindrical cross sectional contour, are relatively stiff and non-vibratory as compared to the relatively flat expanses, and each of them therefore constitutes a strengthening rib lengthwise the tank and thus forms one of the firmer elements of the tank structure adapted for supporting the weaker and more vibratory elements as above referred to.

Fig. 3 shows the lines 19 representing the domes to be struck from centers as 23 so that the opposite ends of the domes merge tangentially into the cylindrical corners 21 at the points 24—24 which it will be observed are considerably within the region X—Y of curvature of said corners.

The domes and the corners are all curved in the same general direction and hence no relatively flat vibratory region occurs between them, and the ends of the domes are made to rest in suitably firm supported relation upon the firmer elements which are the corners 21.

The portions of the domes intermediate the horizontal cross-section Fig. 5 and the vertical cross-section Fig. 3 gradually taper off or merge from one cross-section into the other as will be apparent from the illustration Fig. 1.

The stiff corner portions 21 will be strengthened at intervals by the several diaphragms lengthwise the tank and they may be directly connected with said diaphragms, or in instances where the corner portions of the diaphragms are cut away as is usually the case they will find support in the diaphragms through the medium of the adjacent portions of the side wall which are fixed to the diaphragms.

In some cases, as where the sheet metal employed for the tank side walls is of an unusually light gauge, or where the surface expanse between spaced supports is great, it is desirable to provide means to re-inforce the domes against vibratory movement. To this end the present invention suggests the use of suitable re-inforcing ribs as illustrated. A main rib as 25 is shown as extending diagonally across the dome in one direction, and supplementary ribs as 26—26 are shown extending in the opposite diagonal direction and connected with the mid portion of the main rib. These ribs always follow the curved contour of the walls and domes and of adjacent portions of the walls and have their outer end portions as 27 continuing into supported relation in the curved corner portions 21 so as to partake of the stiffness of said corner portions and to transmit a desirable proportion thereof to the domes.

The inner ends of the supplementary ribs 26 are firmly connected with the mid portion of the main rib.

The re-inforcing ribs may be made up in any manner, but preferably they each consist of an inner member as 28 and an outer member as 29.

The inner member shown is of channel cross section so as to give it the required longitudinal stiffness, and the joints between the ribs 25 and 26 are shown as being formed by tie plates as 30 fixed rigidly to the adjacent flange portions of the channels 28.

The outer member is shown as a simple flat strip of sheet metal fixed along its longitudinal mid portion to the mid portion of the channel 28 and to the intervening portion of the tank wall. Preferably a seam weld as 31 is employed as a means to fix the members 28 and 29 together and to the tank wall.

The outer member 29 is preferably wider than the inner member 28 so that its opposite longitudinal marginal portions as 32—32 project beyond the opposite margins of the member 28 and overlie portions of the tank wall 1 at opposite sides of the member 28, as clearly shown in the detailed view Fig. 7. They thus taper off the stiffness of the reinforcement laterally of the re-inforcement sufficiently to avoid the formation of regions lengthwise the re-inforcement in which stresses are concentrated likely to cause fatigue of the metal of the tank wall.

In some instances the strip 29 may be normally curved in cross section as shown by the dotted lines in Fig. 7, and may be sprung down into parallelism with the wall 1 and held by the connecting means 31. In this way a desirable amount of spring pressure may be brought to bear by the opposite marginal portions of the strip 29 against the wall 1 to assist in the tapering off of vibratory movements and stresses away from the center line of the re-inforcing strip.

The inner ends of the supplementary ribs 26 where they connect with the main rib 27 are spaced apart lengthwise the main rib in order to better distribute the steadying effect of the re-inforcement through the area of the dome, as will be understood from an inspection of the drawings Fig. 1. This spacing of the supplementary ribs along the main rib distributes the stiffness and the weight of the re-inforcing strips and prevents the occurrence of a preponderance of weight in the middle of the dome which might actually cause vibratory movement of the middle portion of the dome instead of preventing it.

Exhaustive experiments have demonstrated further than an improved efficiency in prevention of vibratory movement of the domed tank walls is obtained by arranging the supplementary ribs non-symmetrical with respect to each other, substantially as illustrated, and also that the relationship of these supplementary ribs of the different wall sections L, H and G, to each other should be non-symmetrical. Also the main ribs in the different tank sections should be asymmetrical relative to planes transverse of the tank, or non-symmetrical with respect to each other or at least should incline so that they differ in all adjacent sections. The precise reason for the efficiency obtained by this non-symmetrical positioning of the different re-inforcing ribs is not definitely known but it appears at least to be related to the fact that the different sections L, H and G of the tank and even the different regions of wall surface in each section are subject to independent vibratory movement and to the fact that these vary under different influences such as temperature changes, changes in atmospheric pressure, changes in vibratory moment set up by the engine, and by wind conditions against the whirling propeller, and also particularly by the ever-changing liquid level and weight within the tank. The different positioning of the various re-inforcing ribs of course disposes the weights of said ribs non-symmetrically over the total wall surface concerned and prevents the balancing of one element of said weight against another across any particular area, and this is undoubtedly an important consideration in the effort to prevent localization of vibratory movement. By making all of the adjacent wall areas differ from each other it not only apparently also prevents adjacent areas from vibrating in tune with each other which would naturally dampen the magnitude of vibration and delay fatigue but by making the sections of different periods or frequency responsiveness it results in adjacent sections vibrating at different frequencies with mutually damping effects.

The corner portions are semi-cylindrical, or approximately so, and the radius of said portions is at least fifty times the thickness of the sheet metal employed. A radius of more than one hundred times the thickness has given good results, for instance a radius of 1½ inches and the sheet metal being stainless steel .013 thick.

The arc of curvature of the corner portions should be between approximately 60° and 110°.

The corner portions thus formed possess the desired degree of stiffness and strength without being rigid. The degree of stiffness attained is as nearly as possible the same as that of adjacent wall portions of the tank which are re-inforced by the domes, thus to avoid concentration of stresses where the corner portions merge into said wall portions.

As many changes could be made in this construction without departing from the scope of the invention, as defined in the following claims, it is intended that all matter contained in the above description, or shown in the accompanying drawings, shall be interpreted as illustrative only and not in a limiting sense.

Having thus described my invention, what I claim as new and desire to secure by Letters Patent is:—

1. A fuel tank for aircraft, said tank being formed of thin sheet metal and comprising confining side walls and opposite end walls and a plurality of diaphragms connected with the side walls and dividing said side walls into a plurality of independently vibratable sections longitudinally of the tank, the side wall in each of said sections having a mid portion subject to vibratory energy, and each of said mid portions being domed and shaped so that it is constantly curved throughout its width longitudinally of the tank.

2. A fuel tank for aircraft, said tank being formed of thin sheet metal and comprising confining side walls and opposite end walls and a plurality of diaphragms connected with the side walls and dividing said side walls into a plurality of independently vibratable sections longitudinally of the tank, the side wall in each of said sections having spaced rounded corner portions and mid portions intermediate said rounded corner portions subject to vibratory energy, and each of said mid portions being substantially semispherically domed and shaped so that it is constantly curved throughout its width in directions both longitudinally and transversely of the tank.

3. A fuel tank for aircraft, said tank being formed of thin sheet metal and comprising confining side walls and opposite end walls, the side walls being formed with spaced relatively rounded non-vibratory corner portions and mid portions intermediate said rounded corner portions, said mid portions being subject to vibratory energy but being domed to resist vibrational response to said energy, and stiffening means for one of said domes extending along lines which are non-symmetrical with respect to said dome.

4. A tank having a wall area terminating in a corner curved on a substantially cylindrical arc, said wall area formed into a spherically curved section extending to the curved corner tangentially thereof.

5. A tank having a wall area terminating at opposite margins in corners curved respectively on substantially cylindrical arcs, to each of which part of the area is tangential, another part of the area between the corners curved outwardly to merge tangentially into said corners beyond the first mentioned intersection of the area and corners.

6. A tank having a wall, means defining lateral wall margins, the wall between the margins formed into a continuously curved section described about a plurality of spaced centers.

7. A tank wall, means defining lateral margins, the wall being curved on external centers in the area adjacent to the means, and being curved on an internal center in the area between the first mentioned curves, the respective intersecting curves being mutually tangential.

8. A tank having an area on one side of the tank of potential vibrational responsiveness, means dividing the area into a plurality of independent panels of respectively different vibrational responsiveness to preclude co-vibration of adjacent panels in the area.

9. A tank, comprising a sheet, a reinforcement strip, a line of welds engaging the sheet and reinforcement, said reinforcement having a free edge spaced from the line of welds in the direction of extent of said sheet substantially normal to said line and arranged to damp vibrations approaching the line of engagement.

10. Sheet metal compartments arranged for exposure to incident vibrational energy, comprising a plurality of sheets of sheet metal joined together to form the compartments, a plurality of welds arranged in lines joining contiguous portions of adjacent sheets together, means forming stiffened areas adjacent to the weld lines to prevent the concentration of vibrational stresses at said weld lines.

11. Sheet metal compartments arranged for exposure to incident vibrational energy, comprising a plurality of sheets of sheet metal joined together to form the compartments, a plurality of welds arranged in lines joining contiguous portions of adjacent sheets together, means forming stiffened areas adjacent to the weld lines to prevent the concentration of vibrational stresses at said weld lines, and means carrying a portion of the stiffness of said areas across the sheet metal between weld lines.

CARL DE GANAHL.